United States Patent

[11] 3,567,960

[72] Inventors Charles E. Owen; Christopher N. Wallis, Chandler's Ford, England

[21] Appl. No. 734,287

[22] Filed June 4, 1968

[45] Patented Mar. 2, 1971

[73] Assignee International Business Machines Corporation Armonk, N.Y.

[32] Priority Aug. 26, 1967

[33] Great Britain

[31] 39369/67

[54] GATING CIRCUIT FOR DISPLACED PULSES

10 Claims, 3 Drawing Figs.

[52] U.S. Cl. .......... 307/232, 307/228, 307/233, 307/246, 307/269, 328/36, 328/63, 328/130, 328/139

[51] Int. Cl. .......... H03k 5/20

[50] Field of Search .......... 307/225, 228, 232, 233, 246, 261, 269; 328/22, 36, 63, 72, 109, 130, 139

[56] References Cited

UNITED STATES PATENTS

| | | | |
|---|---|---|---|
| 3,178,583 | 4/1965 | Koch | 307/228 |
| 3,337,747 | 8/1967 | Krasnick et al. | 307/232X |
| 3,371,291 | 2/1968 | Forrest, Jr. et al. | 307/233X |
| 3,405,391 | 10/1968 | Halfhill et al. | 328/109X |
| 3,428,904 | 2/1969 | Aziz | 307/232X |
| 3,484,704 | 12/1969 | Hungerford | 307/233X |

*Primary Examiner*—Stanley T. Krawczewicz

*Attorneys*—Hanifin and Jancin and Nathan N. Kallman

ABSTRACT: A gating circuit useful for separating data pulses from clock pulses in a double frequency detection system includes a signal generator that provides a sawtooth waveform having ramp portions of the same slope and a flyback interval of fixed magnitude. When the sawtooth signal is above a variable threshold, an input gate is enabled to allow the clock pulses to initiate flyback. The proportions of the sawtooth waveform above and below the threshold remain constant, so that early or late arrival of a clock pulse does not affect the gating of succeeding clock pulses. Thus, an output gate is made to operate to block clock pulses while passing data pulses.

*INVENTORS*
CHARLES E. OWEN
CHRISTOPHER N. WALLIS

BY Nathan N. Kallman

ATTORNEY

GATING CIRCUIT FOR DISPLACED PULSES

BACKGROUND OF THE INVENTION

1. Field of the Invention

This invention relates to a novel gating circuit, and in particular to a circuit useful for separating data from clock pulses in a double frequency recording system.

2. Description of the Prior Art

Double frequency coding or modulation is employed extensively in data-processing systems requiring high packing density. In such systems, each bit cell includes a clock pulse, and an additional pulse to indicate data as binary one, or binary zero in the absence of such additional pulse. Thus, a train or series of clock and data pulses are recorded on the storage medium. During detection or the readout mode, the data pulses are separated from the clock and data pulses to reconstitute the information that was originally directed to the storage apparatus.

One problem that arises in this type of a modulation system is a crowding effect, wherein the bits being recorded on a magnetic medium tend to shift away from each other when they are closely spaced; or shift toward each other when they are more widely spaced. In such cases, compensation of the phase and frequency of the clock pulse is needed during readout, in order to be able to distinguish data from clock pulses.

SUMMARY OF THE INVENTION

An object of this invention is to provide a novel and improved data detection system employing double frequency coding.

Another object of this invention is to provide a gating circuit that effectively separates data pulses from clock pulses in a double frequency system.

Another object is to provide means for compensating the phase and frequency of clock pulses in a series of clock and data pulses, as employed in a double frequency detection system.

According to this invention, a data detection system comprises a gating circuit for selecting or separating data pulses from a double frequency coded signal, which includes a train of data and clock pulses. An input gate that receives the input signal train is enabled to sample the input signal during prescribed periods, determined by a variable threshold, each period including one of the clock pulses. The input gate passes the sampled clock pulses to a sawtooth waveform generator to tripper the flyback interval of the sawtooth waveform developed by the generator. The flyback interval is of fixed magnitude, whereas the ramp portions of the sawtooth between flyback intervals have substantially the same slope. In this manner, a sawtooth waveform is produced having a constant proportionate division between the ramp portion occurring below the threshold during which data pulses are passed, and above the threshold, the remaining ramp portion at the end of which the clock pulse trip triggers the flyback.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DESCRIPTION OF THE PREFERRED EMBODIMENT

Figure 1:
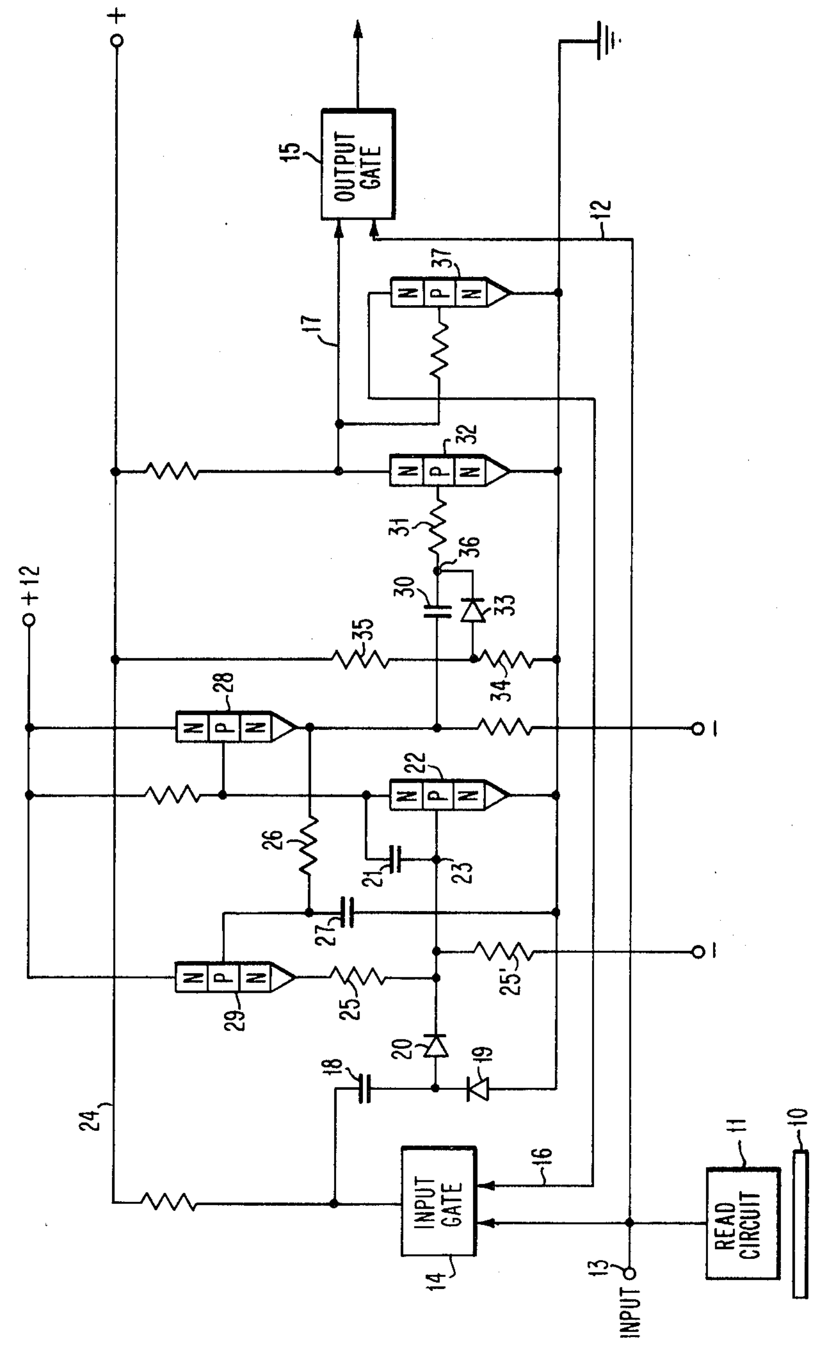
FIG. 1 is a schematic and block diagram depicting the novel gating system of this invention.
Figure 2:
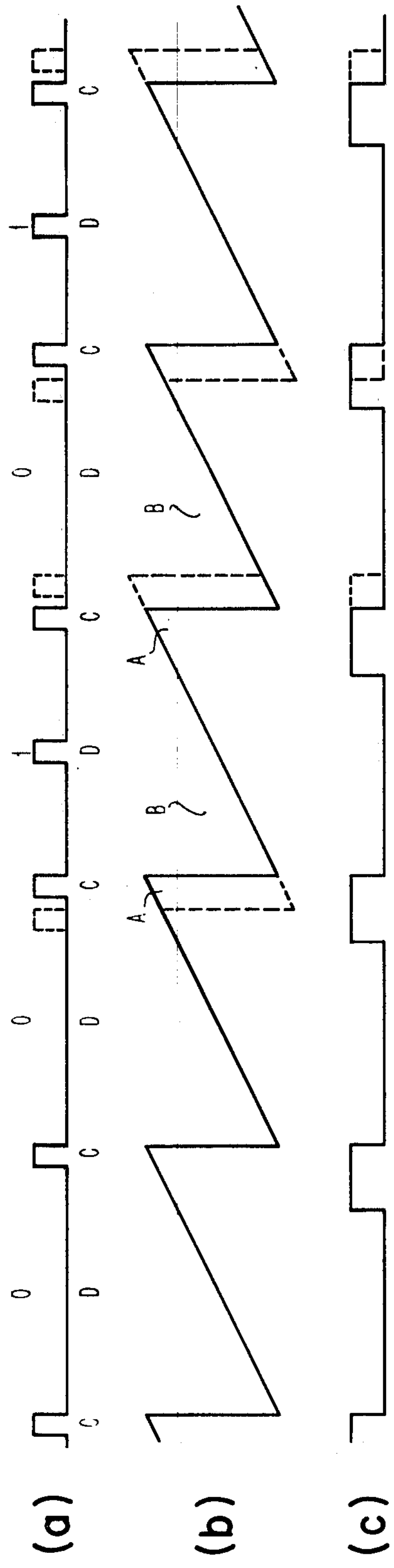
FIG. 2 is a series of waveforms applicable to FIG. 1 to aid in the explanation of the invention.

With reference to FIGS. 1 and 2, data recorded on a magnetic disc 10 is read by a read circuit 11 and applied to the input terminal 13 of a gating circuit, in accordance with this invention. The recorded data is in the form shown in FIG. 2 (*a*), and includes a nominally regular train of clock pulses C separated by intervals, in each of which the presence of a binary pulse D represents a binary 1 and the absence of a binary pulse D represents a binary 0. The clock pulses C are shown in full lines at their nominal positions, and are shown in full lines at their nominal posit dotted lines in actual positions, by way of example. The displacement of the clock pulses to their dotted line positions results from dense recording the the clock and data pulses which, owing to the magnetic interaction of the recorded pulses, tends to spread a pair of clock pulses when interspersed by a data pulse and draw together a pair of clock pulses when interspersed by a gap containing no data pulse.

The recorded data read by the read circuit 11 is applied to the input terminal 13 of the gating circuit, and applied to both an input gate 14 and an output gate 15. The input and output gates 14 and 15 are supplied with enabling signals provided respectively on lines 16 and 17. The enabling signal on the line 16 enables the input gate 14 to pass the clock pulses and to block the data pulses. The enabling signal on the line 17 is the inverse of that supplied to the input gate 14 and therefore enables the output gate to pass the data pulses and to block the clock pulses. The operation of the gating circuit thus consists in the reception of the recorded train of clock and data pulses and the provision of the separated data pulses from the gate 15, in response to the generation of a suitable enabling signal for the gates 14 and 15.

In operation, the clock pulses pass from the input gate 14 and intermittently discharge a capacitor 18 by way of a diode 19 connected to a source of reference potential, such as ground. At the end of each clock pulse the capacitor 18 is recharged by way of a diode 20. The current for recharging comes from a capacitor 21, which is connected in circuit with an NPN transistor 22 to form a Miller integrator. Because the capacitor 21 is connected to form part of the Miller integrator, change in the potential of the terminal 23 between the capacitors 18 and 21 is resisted by change in the collector potential of the transistor 22. At the end of each clock pulse, the collector potential of the transistor 22 exhibits a negative-going step, or flyback, of magnitude dependent only on the capacitance values of the capacitors 18 and 21 and the value of the supple potential for the gate 14 applied on a line 24.

Since each step occurs at the end of the clock pulse which caused it, a full line representation of each step is shown in FIG. 2(*b*) as it would be if caused by the corresponding nominal clock pulse shown in full lines in FIG. 2(*a*). A dotted line representation of each actual step is shown under the corresponding actual clock pulse.

In the interval between each negative-going step and the next, the collector of the transistor 22 rises in potential almost rectilinearly at a rate determined by the supply of current to the capacitor 21 through the resistors 25 and 25'. The collector potential of the transistor 22 therefore follows a sawtooth waveform.

A filter circuit, including a resistor 26 and capacitor 27, receives the sawtooth oscillation from the transistor 22 by way of a transistor 28. The output from the transistor 28 is applied to the base of a transistor 29, to control the supply potential of the resistor 25 and so control the ramp in the sawtooth oscillation. As a result, a tendency for the mean value of the sawtooth oscillation to vary as a result of variation in the clock pulse frequency is compensated by a variation in the ramp of the sawtooth oscillation.

The sawtooth oscillation is supplied to a capacitor 30 which, as the sawtooth oscillation rises above a threshold level T, delivers a current through a resistor 31 to switch on a transistor 32. On the next return step of the sawtooth oscillation below the threshold level the capacitor 30 draws a charging current through a diode 33 from a potential divider formed by resistors 34 and 35.

Any accumulation of charge on the capacitor 30 which causes a rise in the potential of the junction 36 between the capacitor 30 and resistor 31 is resisted by an increased current through the resistor 31. Conversely any accumulation of charge which causes decrease in the potential of the junction 36 is resisted by a decreased current through the resistors 34 and 35. The ramps of the sawtooth oscillation are therefore divided by the threshold level T, at a value for which a given proportion of the sawtooth oscillation is above the threshold level T and a given proportion below the threshold value T. The proportions are determined by the resistance of the charging path for the capacitor 30 in relation to the resistance of the discharging path for the capacitor 30, i.e., the combined resistance of the resistors 34 and 35 in relation to the resistance of the resistor 31.

The charge delivered by the capacitor 30 is represented by the triangular areas A above the threshold level T and the charge received by the capacitor 30 is represented by the triangular areas B below the threshold level T. The ratio of the areas A to the areas B is chosen to be 1:3, by way of example, and the ratio of the resistances for the charging and discharging paths for the capacitor 30 is therefore 1:9.

The variations in collector potential of the transistor 32 are passed through a transistor 37 and constitute the enabling signal (FIG. 2c) for the gate 14. The inverse of the enabling signals of FIG. 2 (c) is applied as the enabling signal for the gate 15.

If the time constants of the filter 26, 27 and of the capacitor 30 and its charge and discharge paths are long in comparison to a period of the signals shown in FIG. 2(a), the effect of misplacement of the clock pulses from their nominal positions will be compensated for by the gating circuit of this invention. Thus if a clock pulse arrives earlier than its allocated nominal time, the corresponding step of the sawtooth oscillation will be early. However, the early step does not result in a misplacement of the sawtooth oscillation as a whole because of the rectilinearity of the beginning and end portions of the ramps and the fixed magnitude of the steps. Conversely the late arrival of a clock pulse causes the corresponding step to be late. Again, the late step does not result in a misplacement of the a sawtooth oscillating as a whole. Since the threshold level is derived by a proportionate division of the sawtooth oscillation, and the sawtooth oscillation is not displaced by displacement of the clock pulses, the gating of each incoming clock pulse is not affected by the misplacement of the preceding pulses.

In order to provide for the initial starting of the gating circuit, the transistor 37 is biased to conduct in the absence of any input, thereby enabling the gate 14 when an input is applied thereto. The initial input signal is preferably a standard signal including no binary ones. The gating circuit may tend to operate at half speed in response to the application of such a standard signal and, in order to avoid half speed operation, the enabling signal can be modified to cause all the input clock pulses to be passed by the gate 14. An alternative method of overcoming half speed operation is to provide a timing circuit capable of detecting operation at speeds other than the desired speed and operable to inhibit operation at any speed other than the desired speed.

The gating circuit has been described for use in a magnetic store in which recorded clock pulses are interspersed by data intervals, which either contain a pulse representing a binary value of one or which contain a gap having no binary pulse. The gating circuit can be applied to a magnetic store in which the recorded information takes the form of an oscillation which reverses phase upon each transition from one binary value to the other as shown in FIG. 3(a).

Figure 3:
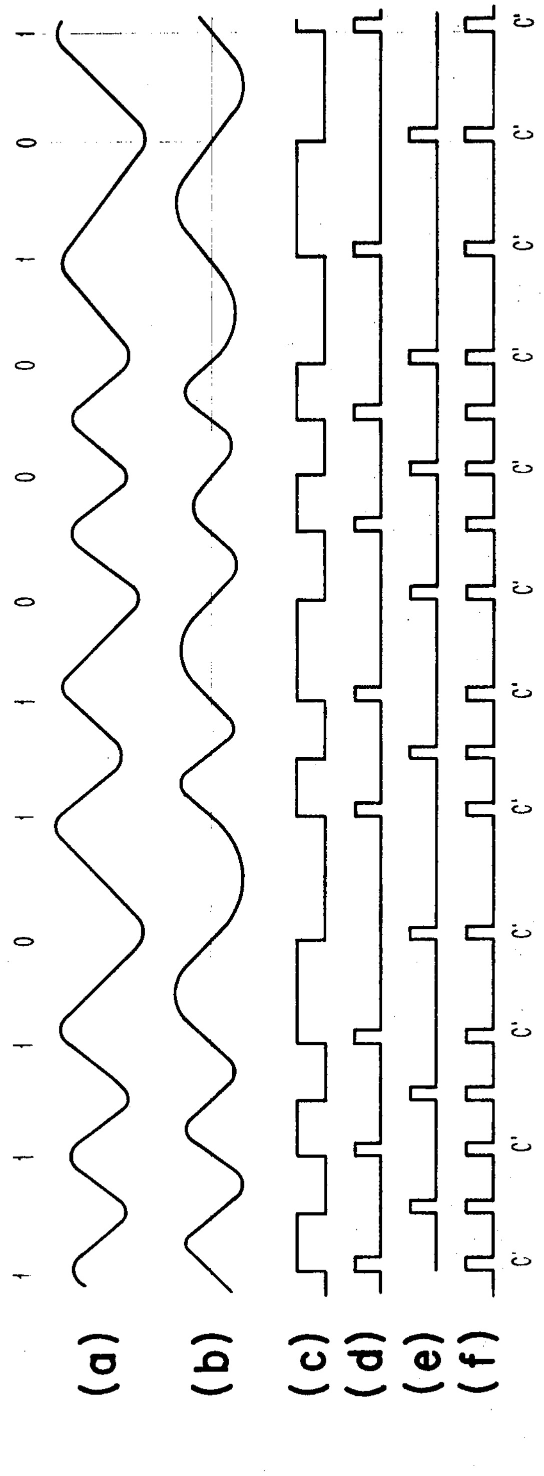
FIG. 3 is another series of waveforms applicable to a modified circuit, in accordance with this invention.

The oscillation of FIG. 3(a) can be used to derive the train of pulses shown in FIG. 3(f) by differentiation to derive the oscillation shown in FIG. 3(b) and squaring to achieve the waveform shown in FIG. 3(c). A pulse train representing the positive transitions of the square waveform and a pulse train representing the negative transitions of the square waveform are derived as shown in FIGS. 3(d) and 3(e) respectively. The addition of the pulse trains of FIGS. 3(d) and 3(e) results in the pulse train of FIG. 3(f). Displacement of the pulses in the train of FIG. 3(f) may occur for reasons described heretofore.

The gating circuit of this invention can be used to gate the train of pulses of FIG. 3(f) so as to divide the pulses labeled C' from the remaining pulses, in the manner described with reference to FIGS. 1 and 2. The pulses C' represent clock pulses. The gating signal used to gate the pulses C' from the train of FIG. 3(f) can be applied to gate the pulses in the train of FIG. 3(d) to derive data pulses representing the binary data of the oscillation of FIG. 3(d). It is apparent that the gating circuit of FIG. 1 is of more general application than the separation of pulses as recorded in the store described with reference to FIG. 1.

While the invention has been particularly shown and described with reference to a preferred embodiment thereof, it will be understood by those skilled in the art that the foregoing and other changes in form and details may be made therein without departing from the spirit and scope of the invention.

We claim:

1. A gating circuit for selecting input timing pulses from an input signal which includes a train of such pulses comprising:
   - an input gate for receiving the input signal;
   - enabling means connected to enable the input gate to sample the input signal during periods each timed to include one of the input timing pulses; and
   - a sawtooth signal generator connected to receive the sampled signals from the input gate, each of the input timing pulses passed by the input gate being effective to trigger a flyback of the sawtooth signal, the sawtooth signal waveform having a fixed flyback magnitude and having ramp portions of substantially the same slope between flyback intervals, the enabling means being responsive to the sawtooth signal to enable the input gate whenever the sawtooth signal is above a controlled level along a ramp portion.

2. A gating circuit according to claim 1, wherein the sawtooth generator has a control means which control the slopes of the ramp portions to compensate for variation in the sawtooth signal waveform.

3. A gating circuit as in claim 1, including means for determining the controlled level and for proportioning the sawtooth waveform to provide preselected portions of the sawtooth waveform above and below the controlled level.

4. A gating circuit according to claim 3, wherein said determining and proportioning means comprise a capacitor having one electrode connected to receive the sawtooth signal, and the other electrode connected to receive a charging current through a rectifying circuit biased for cutoff whenever the other electrode of said capacitor rises to a preselected potential in response to the sawtooth signal.

5. A gating circuit for selecting input timing pulses from an input signal which includes a train of such pulses comprising:
   - an input gate for receiving the input signal;
   - enabling means connected to enable the input gate to sample the input signal during periods each timed to include one of the input timing pulses;
   - a sawtooth signal generator connected to receive the sampled signals from the input gate, each of the input timing pulses passed by the input gate being effective to tripper a flyback of the sawtooth signal, the sawtooth signal waveform having a fixed flyback magnitude and having ramp portions of substantially the same slope between flyback intervals, the enabling means being responsive to the sawtooth signal to enable the input gate whenever the sawtooth signal is above a controlled level along a ramp portion, wherein the sawtooth generator comprises a pair of capacitors, a first of which transfers charge to the second in response to each input timing pulse, each flyback of the sawtooth waveform being derived from such a transfer of charge.

6. A gating circuit according to claim 5, wherein a junction between the pair of capacitors is maintained at a substantially uniform potential during each transfer of charge.

7. A gating circuit according to claim 6, wherein the second of the capacitors is connected between the base and collector electrodes of a transistor to constitute a Miller integrator, the junction between the pair of capacitors being connected in common with the base electrode of the transistor.

8. A gating circuit according to claim 6, wherein the control circuit comprises a filter coupled to the sawtooth generator, the junction between the capacitors being connected to a supply circuit which supplies current thereto under the control of the filter.

9. A magnetic store comprising:

a magnetic medium for storing recorded information having two groups of interspersed pulses, one group of pulses representing intelligent data, the second group representing timing data;

means for reading out the recorded information from said medium for obtaining a signal including a train of pulses of said one group; and a gating circuit for gating the intelligent data pulses to an output circuit, said gating circuit comprising means for generating a sawtooth signal having a constant proportion between each signal portion below a controlled threshold and the signal portion of the same cycle above such threshold for every cycle of oscillation.

10. A magnetic store according to claim 9, wherein the data is recorded in the form of a phase modulated oscillation.